Patented Jan. 26, 1932

1,842,929

UNITED STATES PATENT OFFICE

CHARLES EVERETT BILLS, OF EVANSVILLE, INDIANA, ASSIGNOR TO MEAD JOHNSON & COMPANY, OF EVANSVILLE, INDIANA, A CORPORATION OF INDIANA

PROCESS OF PREPARING ERGOSTEROL

No Drawing.   Application filed April 9, 1928.   Serial No. 268,791.

This invention relates to new and useful improvements in processes of preparing ergosterol. Ergosterol is a sterol found in minute amounts in a variety of vegetable and animal tissues, and in somewhat greater quantities in the fatty matter of fungi, such as ergot, mushrooms, and yeast. Its value lies in the fact that it is convertible into a potent antirachitic substance having the therapeutic properties of vitamin D.

One of the objects of my invention is to produce ergosterol in commercial quantities, at a non-prohibitive cost, and by a dependable and comparatively simple process.

Another object of the invention is to devise a process of preparing ergosterol in which decomposition of the product is avoided.

Another object is to improve methods of preparing ergosterol, which include saponification of fatty materials as a step of the processes, by eliminating the use of solvents in the extraction of the sterols from the soapy solution, thereby minimizing in my product the oily and colored matters which contaminate ergosterol which has been extracted with the use of solvents; and to accomplish the extraction from the saponaceous solution by exceedingly efficient and inexpensive means.

By the process about to be described, ergosterol of superior quality may be prepared from fungus fat in commercial quantities, without decomposition of the product during treatment and at greatly reduced costs as compared with other methods.

The method of extracting the fungus fat from fungi is not a part of the present invention. It may be extracted from yeast, ergot, and mushrooms, and from other fungi, by using suitable solvents, of which acetone is one, and then evaporating off the solvent.

Having obtained a suitable quantity of fungus fat, the first step in my invention is to saponify an acetone solution of fungus fat by treatment with an alcoholic solution of potassium hydroxide or sodium hydroxide. For example, to 100 cc. of fungus fat, warmed to its melting point if not already fluid, is added 500 cc. of acetone. This solution is then mixed with a solution of caustic alkali, preferably potassium hydroxide, previously prepared by dissolving 25 grams of the alkali in 200 cc. of 95 percent ethyl alcohol. The solution is then boiled gently for five to ten minutes, and then allowed to cool.

It has been customary, in the saponification of fats, to treat the fat directly with the alkali in either an aqueous or alcoholic solution. When fungus fat is subjected to such treatment, considerable decomposition of the ergosterol takes place. I have found that by first dissolving the fungus fat in acetone and then subjecting it to the alkali, as set forth in the preceding paragraph, the sterol is protected from decomposition.

The second step of my improved process consists in removing the ergosterol from the saponification mixture. To precipitate the ergosterol, one liter of water is added to the above described saponification mixture and the resultant solution chilled, preferably to about twenty degrees below zero centigrade. After the liquid has stood at this temperature for several hours, preferably ten or twelve, practically all the ergosterol is precipitated as an amorphous, light colored, flocculent mass. The precipitate is then removed from the soapy liquid by filtration or by centrifugal separation. The success of this procedure depends upon employing the correct amount of water. If much less than one liter is employed in the present example, for instance, only 300 cc., the ergosterol is incompletely precipitated, and if much more than one liter is used, for instance, five liters, a frothy soap solution results which holds the ergosterol partly in colloidal suspension and makes separation unnecessarily difficult. Solutions that are too dilute are, of course, liable to freeze. For the present example one liter is approximately the optimum volume of water.

Heretofore the removal of sterols from their soap solutions has been accomplished by adding water and an immiscible organic solvent, such as ether, petroleum or benzene, and to then recover the sterol by evaporating the solvent. By the step of my process described in the preceding paragraph I avoid the use of solvents and the consequent extraction of those oily and colored matters which usually contaminate the ergosterol which has been extracted from the soapy solution by solvents. Another important factor resulting from the elimination of solvents to remove the sterols from the saponaceous solution is the reduced cost of extraction.

If the soapy mixture exhibits objectionable frothiness after the addition of the water referred to, a small quantity of capryl alcohol may be added, one or two cc., which will eliminate the foaminess and permit the ergosterol to become properly precipitated.

The crude ergosterol prepared by the method which is the subject of this application may then be purified by any suitable process. My preferred process of purifying ergosterol is set forth, described, and claimed in an application which is a division hereof and co-pending herewith, Serial No. 355,440, filed April 15, 1929.

The use of the products referred to in the proportions stated and the particular steps described for carrying out my process, have been found to produce excellent results; but, obviously, variations may be made without departing from the scope of my invention. I do not desire to be limited to the exact details stated, except as set forth in the appended claims.

I claim as my invention:

1. An improvement in processes of preparing ergosterol, which consists in saponifying yeast fat by dissolving the yeast fat in acetone and treating the acetone solution with potassium hydroxide.

2. An improvement in processes of preparing ergosterol, which consists in saponifying fungus fat by dissolving the fat in acetone in the proportion of 100 grams of fat in 500 cc. of acetone, and treating the acetone solution with an alkali metal hydroxide.

3. An improvement in processes of preparing ergosterol, which consists in saponifying fungus fat by dissolving the fat in acetone in the proportion of 100 grams of fat in 500 cc. of acetone, and treating the acetone solution with 25 grams of potassium hydroxide dissolved in 200 cc. of 95 percent ethyl alcohol.

4. An improvement in processes of preparing ergosterol, which consists in precipitating the ergosterol in a fungus fat saponifying mixture made up of fungus fat, acetone, and a soluble soap-producing alkali, by the addition of water.

5. An improvement in processes of preparing ergosterol, which consists in precipitating the ergosterol in a fungus fat saponification mixture, containing acetone and an alkali metal hydroxide in alcohol, by the addition of water.

6. An improvement in processes of preparing ergosterol, which consists in precipitating the ergosterol in a fungus fat saponification mixture, made up of fungus fat in the proportion of 100 grams of fat to 500 cc. of acetone and 25 grams of potassium hydroxide dissolved in alcohol, by the addition of water.

7. An improvement in processes of preparing ergosterol, which consists in precipitating the ergosterol from a fungus fat saponification mixture consisting of fungus fat, acetone, and soluble soap-producing alkali, by the addition of water and by chilling the saponaceous solution.

8. An improvement in processes of preparing ergosterol, which consists in precipitating the ergosterol from a fungus fat saponification mixture consisting of fungus fat, acetone, and soluble soap-producing alkali, by the addition of water and by chilling the saponaceous solution to $-20°$ centigrade.

9. An improvement in processes of preparing ergosterol, which consists in precipitating the ergosterol in a fungus fat saponification mixture, made up of fungus fat in the proportion of 100 grams of fat to 500 cc. of acetone and 25 grams of potassium hydroxide dissolved in alcohol, by the addition of water and chilling the saponaceous solution to $-20°$ centigrade.

10. An improvement in processes of preparing ergosterol, which consists in precipitating the ergosterol in a yeast fat saponification mixture made up of yeast fat, acetone, and a soluble soap-producing alkali by the addition of water.

11. An improvement in processes of preparing ergosterol, which consists in precipitating the ergosterol in a yeast fat saponification mixture, containing acetone and an alkali metal hydroxide in alcohol, by the addition of water.

12. The process of preparing ergosterol which consists in saponifying fungus fat by dissolving the fat in acetone, treating the acetone solution with an alkali metal hydroxide, diluting the saponaceous solution with water, chilling the resultant mixture to precipitate the ergosterol, and separating the precipitated ergosterol from the saponaceous liquor by filtration.

13. An improvement in processes of preparing ergosterol, which consists in precipitating the ergosterol in a fungus fat saponification mixture, made up of fungus fat in the proportion of 100 grams of fat to 500 cc. of acetone and 25 grams of potassium hydroxide dissolved in alcohol, by the addition of about one liter of water, and chilling the saponaceous solution to $-20°$ centigrade.

14. The process of preparing ergosterol which consists in saponifying fungus fat by dissolving the fat in acetone, the saponification mixture being made up of fungus fat in the proportion of 100 grams of fat to 500 cc. of acetone, treating said mixture with 25 grams of an alkali metal hydroxide dissolved in alcohol, diluting the resultant saponaceous solution with about one liter of water, chilling the resultant mixture to about $-20°$ centigrade, and separating the precipitated crude ergosterol from the saponaceous liquor by filtration.

15. The process of preparing ergosterol which consists in saponifying fungus fat by dissolving the fat in acetone, the saponification mixture being made up of fungus fat in the proportion of 100 grams of fat to 500 cc. of acetone, treating said mixture with 25 grams of an alkali metal hydroxide dissolved in alcohol, diluting the resultant saponaceous solution with about one liter of water, adding capryl alcohol to the diluted solution, chilling the resultant mixture to about $-20°$ centigrade, and separating the precipitated crude ergosterol from the saponaceous liquor by filtration.

16. An improvement in processes of preparing ergosterol from fungus fat which consists of dissolving the fungus fat in acetone and treating the acetone solution with an alkali metal hydroxide.

17. The process of preparing ergosterol from fungus fat, which consists in dissolving the fungus fat in acetone, saponifying the acetone solution to produce a soluble soap, and precipitating the ergosterol by the addition of water and by chilling the saponaceous solution.

18. The process of preparing ergosterol from fungus fat which consists in dissolving fungus fat in acetone, in the proportion of 100 grams of fat to 500 cc. of acetone, saponifying the acetone solution to produce a soluble soap, and precipitating the ergosterol by the addition of about one liter of water and by chilling the saponaceous solution.

In testimony that I claim the foregoing as my invention I affix my signature this 4th day of April, 1928.

CHARLES EVERETT BILLS.